United States Patent
Kritayakirana et al.

(10) Patent No.: US 6,798,540 B1
(45) Date of Patent: Sep. 28, 2004

(54) METHOD AND APPARATUS FOR UNDERPRINTING PIXELS

(75) Inventors: Kong Kritayakirana, Sunnyvale, CA (US); Daniel R Tretter, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 884 days.

(21) Appl. No.: 09/703,281

(22) Filed: Oct. 31, 2000

(51) Int. Cl.$^7$ ................................................ H04N 1/58
(52) U.S. Cl. ....................... 358/1.9; 358/3.26; 358/530; 358/540
(58) Field of Search ................................ 358/1.9, 3.26, 358/504, 518, 529, 530, 540

(56) References Cited

U.S. PATENT DOCUMENTS

| | | | | |
|---|---|---|---|---|
| 5,542,052 A | * | 7/1996 | Deutsch et al. | 345/589 |
| 6,549,303 B1 | * | 4/2003 | Trask | 358/1.9 |
| 2002/0167526 A1 | * | 11/2002 | Kinoshita | 345/589 |

FOREIGN PATENT DOCUMENTS

| | | | | |
|---|---|---|---|---|
| JP | 2002225350 A | * | 8/2002 | B41J/2/525 |

* cited by examiner

*Primary Examiner*—Scott Rogers (57) ABSTRACT

Methods and apparatus for trapping to prevent a polychromatic printing artifact are described. One method includes the step of selecting a region of a source image comprising a plurality of concentric rings of pixels centered about a selected pixel. Each pixel has a plurality of toner values. Each of the toner values considered for trapping is associated with a non-black color plane. A trapped value is generated for each color plane of the selected pixel. The trapped value for a selected color plane corresponds to the maximum toner value for that color plane within the smallest ring having at least one non-black pixel. A trapped flag for each color plane of the selected pixel is generated. The trapped flag for a selected color plane is enabled only if the selected pixel is black and at least one ring not comprising the selected pixel includes a pixel having a nonzero toner value for the selected color plane. The trapped value is substituted for the corresponding toner value of a given color plane of the selected pixel, if the trapped flag for the given color plane is enabled.

19 Claims, 8 Drawing Sheets

| RING 1 TRAP | RING 2 TRAP | RING 3 TRAP | TRAPPED FLAG | TRAPPED VALUE | COMMENT |
|---|---|---|---|---|---|
| 1 | X | X | NO | RING 0 COLOR | COLOR PIXEL |
| 0 | 1 | X | YES | RING 1 COLOR | BLACK PIXEL ADJACENT COLOR PIXEL |
| 0 | 0 | 1 | YES | RING 2 COLOR | BLACK PIXEL WITHIN 2 PIXELS OF COLOR PIXEL |
| 0 | 0 | 0 | NO | DEFAULT | BLACK PIXEL IN BLACK REGION |

| C1 | C2 | C3 | C4 | C5 |
|----|----|----|----|----|
| C6 | C7 | C8 | C9 | C10 |
| C11 | C12 | C13 | C14 | C15 |
| C16 | C17 | C18 | C19 | C20 |
| C21 | C22 | C23 | C24 | C25 |

820

| P1 | P2 | P3 | P4 | P5 |
|----|----|----|----|----|
| P6 | P7 | P8 | P9 | P10 |
| P11 | P12 | P13 | P14 | P15 |
| P16 | P17 | P18 | P19 | P20 |
| P21 | P22 | P23 | P24 | P25 |

METHOD AND APPARATUS FOR UNDERPRINTING PIXELS

FIELD OF THE INVENTION

This invention relates to the field of printing. In particular, this invention is drawn to whitegap reduction resulting from misregistration of color planes during color printing.

BACKGROUND OF THE INVENTION

Color or polychromatic printing processes typically treat color images as a composition of color planes. The number of planes is a function of the selected color space. A red-green-blue (RGB) color space requires three planes. A cyan-magenta-yellow-black (CMYK) color space requires four planes.

Correct alignment of the individual planes is necessary for faithful reproduction of the source image. Spatial misalignment of the color planes during the printing process is referred to as misregistration. In CMYK color space, for example, misregistration can result in a whitegap artifact when one of the primary color planes (CMY) is printed next to black.

Various techniques for reducing whitegap artifacts have been developed. The color data may be modified after rasterization to reduce whitegap artifacts. One approach modifies luminance using a weighted combination of CMYK data. Typically, this approach requires significant computational resources due to the requirement of high-precision arithmetic calculations. This approach is also memory intensive because of the use of memory-resident templates needed to locate the edges.

Another approach uses a 72×72 pixel mask to implement a single pixel decision. This large mask size requires substantial memory to buffer 72 pixel rows. Another approach examines post-halftone data at one bit per pixel to perform the trapping and thus needs multiple passes to do the processing. Yet another approach performs a single bit pixel misregistration artifact correction. This approach, however, tends to fail when the registration errors are greater than one pixel.

SUMMARY OF THE INVENTION

In view of limitations of known systems and methods, methods of trapping to prevent a polychromatic printing artifact are described. One method includes the step of selecting a region of a source image comprising a plurality of concentric rings of pixels centered about a selected pixel. Each pixel has a plurality of toner values. Each of the toner values considered for trapping is associated with a non-black color plane. A trapped value is generated for each color plane of the selected pixel. The trapped value for a selected color plane corresponds to the maximum toner value for that color plane within the smallest ring having at least one non-black pixel. A trapped flag for each color plane of the selected pixel is generated. The trapped flag for a selected color plane is enabled only if the selected pixel is black and at least one ring not comprising the selected pixel includes a pixel that is non-black. The trapped value is substituted for the corresponding toner value of a given color plane of the selected pixel, if the trapped flag for the given color plane is enabled.

In one embodiment, an apparatus includes a pixel classifier classifying each pixel within a selected region of a source image as black or not black. The selected region is composed of a plurality of rings of pixels centered about a selected pixel. A plurality of ring trap logic circuits are associated with a selected color plane. Each trap logic circuit generates a ring trap flag and a ring toner value for an associated selected ring of pixels. The ring toner value is the maximum toner value for the selected color plane within the selected ring. The ring trap flag indicates whether at least one pixel within the selected ring is not black. A priority assignment unit coupled to the ring trap logic circuits provides a trapped flag if the ring trap flag for any ring other than the ring comprising the selected pixel is set. The priority assignment unit provides a trapped value corresponding to the toner value of the smallest ring having its ring trap flag set. A plurality of multiplexers are coupled to select one of the trapped value and the selected pixel's original toner value for the corresponding color plane in accordance with a control signal. Logic circuitry generates the control signals in response to the trapped flag for each color plane and a trap enable signal. The multiplexer associated with a given color plane selects the corresponding trapped value only if the trapped flag for that color plane is set and the trap enable signal is enabled.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Electrophotography (EP) laser printers operate by creating an image to be rendered on an electrically charged transfer device such as a rotating drum. The image is typically created using a laser source to expose a photoconductive medium (e.g., the drum) on a pixel by pixel basis by pulsing the laser. Some laser printers permit only on/off control of the pixel and thus the laser pulses are fixed width. Other laser printers permit varying the pulse width of the laser source and thus have partial pixel control. Toner is applied to the photoconductive transfer device and adheres through electrostatic attraction in the form of the image. The transfer device transfers the toner to the final medium such as paper. For color laser printers, each pixel of the image has multiple toner values. Each toner value for a given pixel describes the amount of toner associated with a specific color plane to be applied. Thus each pixel may have varying amounts of toner from each color plane of the printing process.

Depending upon the specifics of the printer engine, the process may be susceptible to creating visual artifacts from anti-aliased edges in the original image, whitegaps from misregistration for color laser printers, receding edges, and other anomalies. Image features that tend to cause these artifacts can be detected so that compensating actions may be taken to reduce the visual artifacts. One form of compensation referred to as "trapping" describes the process of underprinting black pixels with the adjacent color along edges in regions otherwise likely to produce whitegap artifacts.

Figure 1:
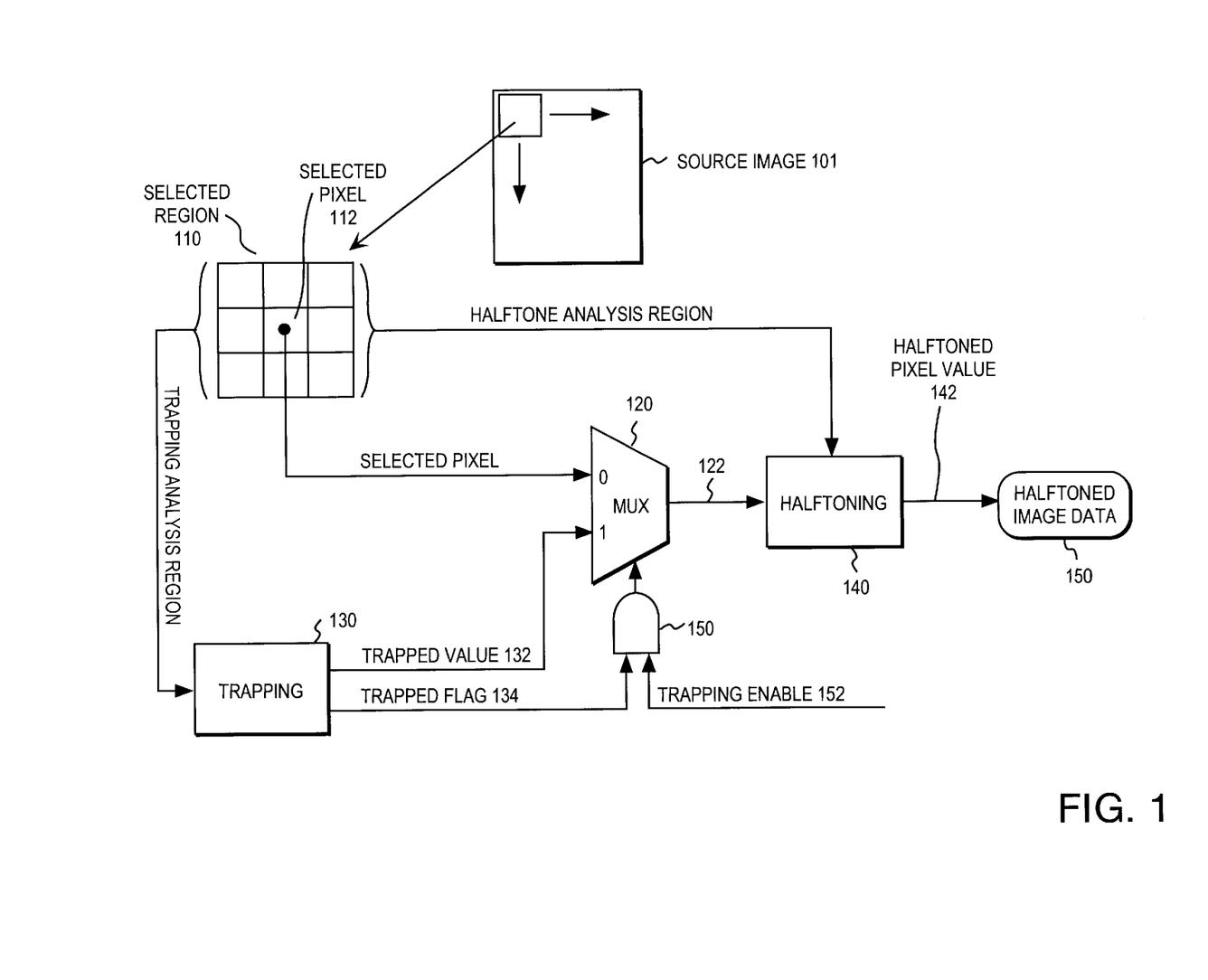
FIG. 1 illustrates a halftoning process with trapping.

FIG. 1 illustrates a halftoning process that incorporates trapping. Trapping block 130 performs a trapping analysis on a selected region 110 of source image 101 containing selected pixel 112 to determine whether the selected pixel might be a candidate for underprinting and if so, then indicating the color value that the pixel under consideration should have. Assuming that trapping is enabled (trap enable signal 152), multiplexer 120 selects either the selected pixel value 112 or the suggested color (trapped value 132) in accordance with the trapped flag signal 134. If trapping is not enabled, then logic circuitry 150 ensures that multiplexer 120 defaults to selecting the selected pixel value 112. The output of the multiplexer 122 is provided to halftoning block 140.

Halftoning block 140 analyzes a region of pixels including the selected pixel 112 to determine a halftone value for the selected pixel 112. In one embodiment, the halftoning analysis region is identical to the selected region 110 used for trapping analysis. In an alternative embodiment, the halftoning analysis region and the selected region 110 are not the same. Halftoning block 140 generates the halftoned pixel value 142 corresponding spatially to the selected pixel 112.

The process is repeated by treating the selected region 110 as a window that can be moved about the source image 101 to select different regions. The window is moved about the source image 101 to generate the halftoned pixel values for source image 101. The resulting halftoned pixel values 142 form the halftoned image data 150 for the source image 101.

Figure 2:
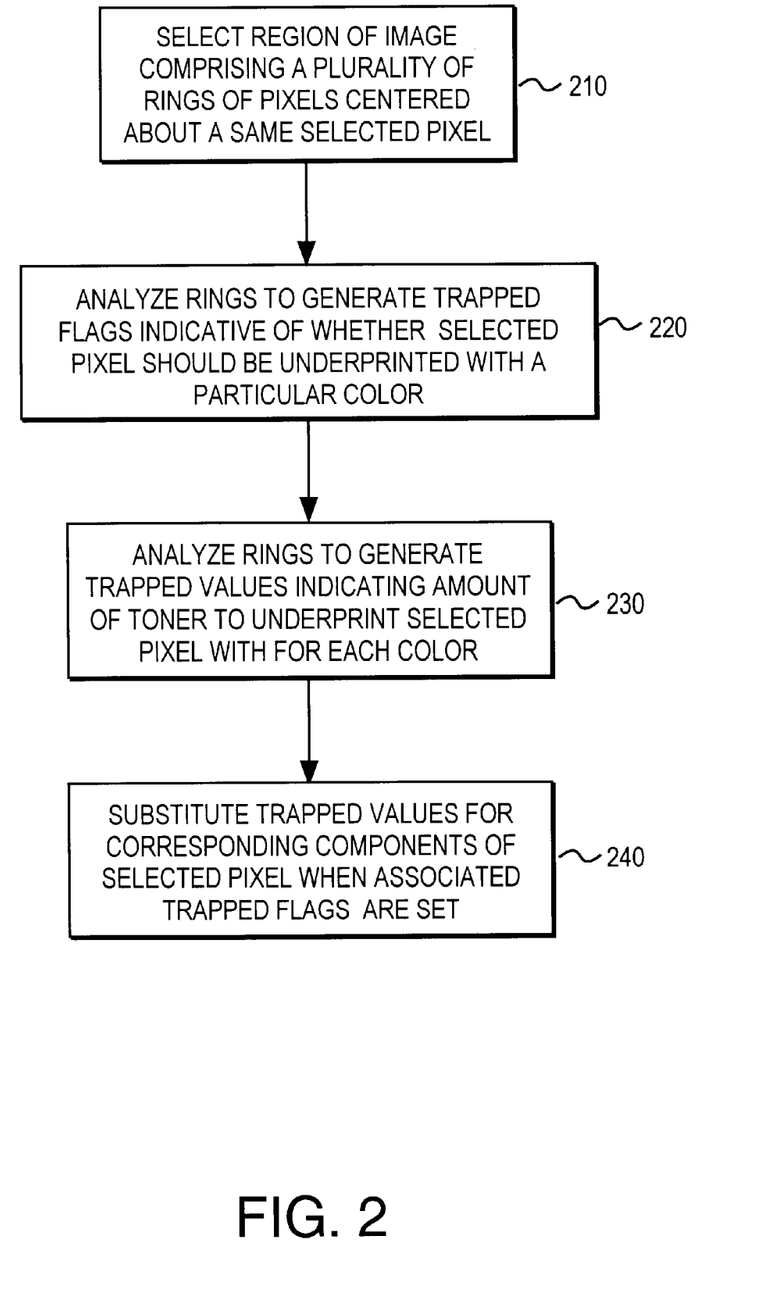
FIG. 2 illustrates an overview of one embodiment of a trapping process.

FIG. 2 illustrates one embodiment of a trapping process. In step 210 a region of the image is selected. In one embodiment, the selected region comprises a plurality of concentric rings of pixels centered about the same selected pixel. Generally, this means that the selected region is an M×N area of pixels where M and N are odd integers. In one embodiment M=N. An individual ring identified as ring i comprises all the pixels $(\pm i,j)|_{j=-i-m \ldots i+m}$, $(j,\pm(i+m)|_{j=-i+1 \ldots i-1}$, where i and j indicate relative x and y displacements (integer pixel distances) from the selected pixel and m is an integer constant. In one embodiment, m is assigned the value 0.

In step 220, the rings are analyzed to generate trapped flags indicative of whether underprinting the selected pixel with a specific color is recommended. In step 230, the rings are analyzed to generate trapped values corresponding to the color that the selected pixel should be underprinted with. The trapped values indicate the amount of toner to underprint the selected pixel with for each color plane (other than black). Typically, these values represent toner from other color planes to be contributed to the selected pixel. In step 240, the trapped values are substituted for the corresponding color plane components of the selected pixel when the trapped flags for those color planes are set.

Figure 3:
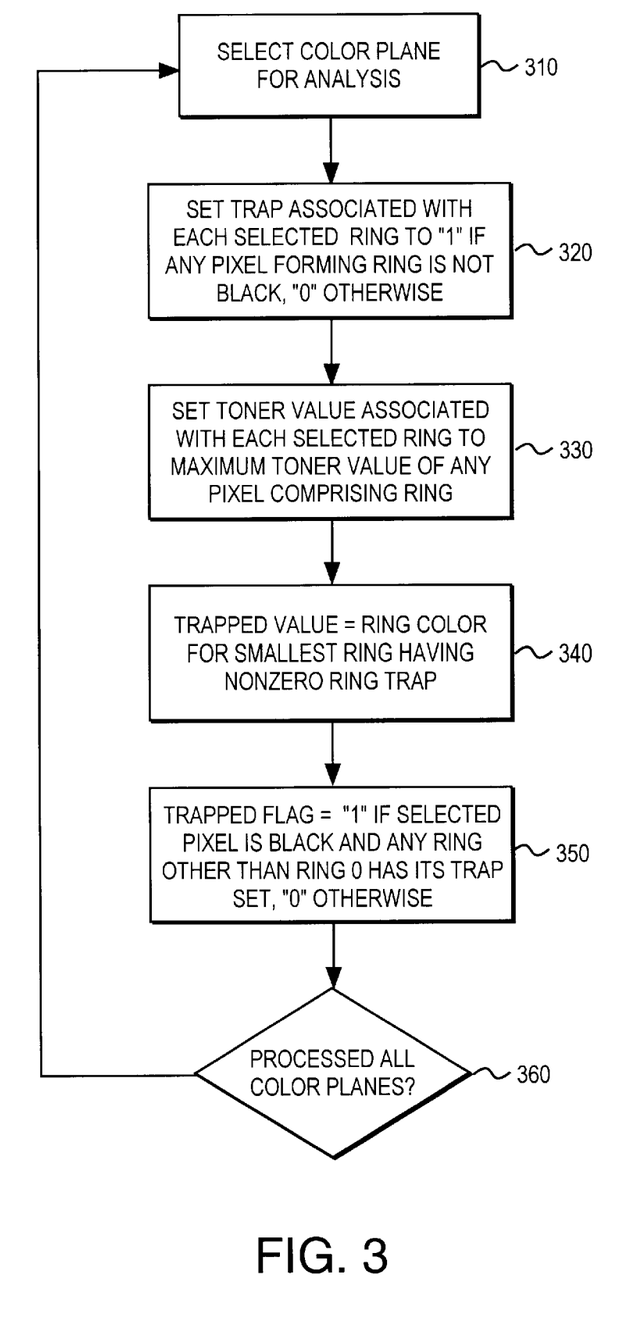
FIG. 3 illustrates a process for generating a trapped flag and a trapped value for each color plane of a selected region of a source image.

FIG. 3 illustrates greater detail for the analysis steps 220–230 of FIG. 2 as applied to each color plane. Generally, a trapped flag and a trapped value are generated for each color plane. The trapped flag indicates whether the trapped value should be substituted for the corresponding color component of the selected pixel. The trapped value indicates the amount of toner to be applied for a particular color plane. Intermediate determinations for trapped values and trapped flags are made for each ring of the selected region for the selected color plane. These ring values and ring flags are subsequently prioritized to generate the trapped value and flags.

In step 310, a color plane is selected. Given that black is the subject color in this example, only non-black color planes are analyzed to determine the amount of non-black toner to be used in the underprinting. In a CMYK color space, no determination as to the amount of black toner to underprint a black pixel would be necessary, thus the K plane would be excluded from analysis. In an RGB color space, however, each of the color planes is analyzed because black is not an independent color plane.

For the selected color plane step 320 analyzes each ring of the selected region. Each ring has a ring trap and a ring value. The ring value corresponds to the amount of toner to be applied from the selected color plane to the selected pixel as determined by a given ring. A ring trap is set to "1" if any pixel forming that ring is non-black. The ring trap is set to "0," otherwise. Thus the ring trap variable for each ring is a flag that indicates whether any pixel within the selected ring has a color component from the selected color plane other than black. In one embodiment, the ring trap variable is a boolean variable where "1" indicates that at least one pixel in the selected ring has a non-zero color component from the selected color plane and "0" indicates that none of the pixels in the selected ring have toner from the selected color plane. Generally, the boolean value "1" refers to "set" or "enabled" and "0" corresponds to "reset" or "disabled".

In step 230, the ring toner variable for each selected ring is set to the maximum toner value (from the selected color plane) of all the pixels within that ring. For example, each pixel can have a toner value ranging from 0 (no toner) to N (100% toner) for each color plane. From the set of toner values associated with the pixels comprising a selected ring, step 330 selects the maximum toner value from the selected color plane as that ring's toner value.

A resulting trapped value for the selected color plane of the selected pixel is determined in step 340. In one embodiment, the trapped value is the ring toner value for the smallest ring having a nonzero ring trap (i.e., the smallest ring having the ring trap set). Thus priority is given to the proximity of the pixels comprising the ring to the selected pixel. In step 350 a trapped flag is set to "1" if the selected pixel is black and any ring other than ring 0 has its ring trap set, otherwise the trapped flag is assigned a value of "0".

Step 360 is provided to illustrate that the process of determining trapped values and flags is performed for each color plane. Assuming trapping is enabled, the selected pixel is underprinted with the trapped values from any color plane having a set trapped flag. The process in FIG. 3 applies to a single pixel. The rest of the source image is similarly processed by shifting the window of consideration corresponding to the selected region around the source image.

Figure 4:
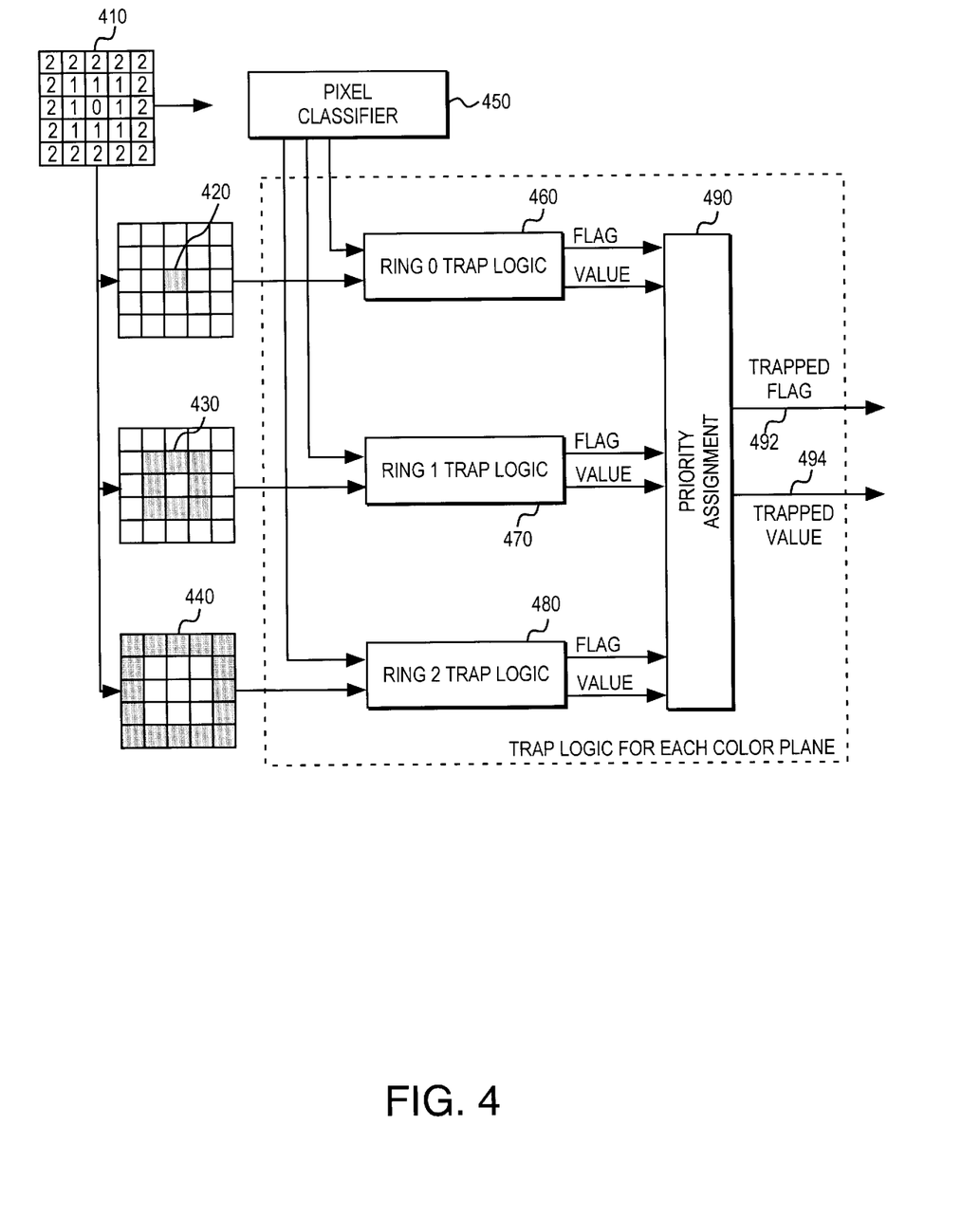
FIG. 4 illustrates apparatus for generating a trapped flag and a trapped value for a selected region of a source image.

FIG. 4 illustrates application of the process of FIG. 3. A selected region 410 comprises a plurality of rings 420, 430, and 440 centered about a selected pixel 420 (ring 0 is the selected pixel). The values 0, 1, and 2 have been indicated in region 410 to identify the pixels associated with ring 0, ring 1, and ring 2, respectively.

The process of FIGS. 2–3 require classification of pixels as black or non-black independently of the color plane being processed. Pixel classifier 450 classifies pixels into two categories: black and non-black. Only a single pixel classifier is necessary. The results are provided to the ring trap logic for each color plane (only one of which is illustrated).

For example, the result of each pixel's classification is provided to ring trap logic 460, 470, and 480 for the individual rings. The trap logic looks at a local ring of data and identifies an appropriate amount of toner from the selected color plane to underprint the selected pixel at the center of the ring with in order to reduce white-gapping without producing undesirable artifacts. The trap logic for each ring operates independently.

The trap logic for each ring (i.e., ring 0 460, ring 1 470, ring 2 480) generates two values: a ring trap and a ring toner. The ring toner is the suggested amount of toner from the selected color plane that the selected pixel should be underprinted with as determined by the present ring, if trapping is to occur. The ring trap indicates whether trapping for the current ring is recommended.

The results from the trap logic 460, 470, and 480 are provided to priority assignment unit 490. Priority assignment unit 490 prioritizes the trap and toner decisions based on the proximity of the pixels comprising the ring (i.e., the size of the ring) to the selected pixel. In one embodiment, priority assignment unit 450 generates the trapped flag 492 and the trapped value 494 in accordance with truth table 500 of FIG. 5.

Figure 5:
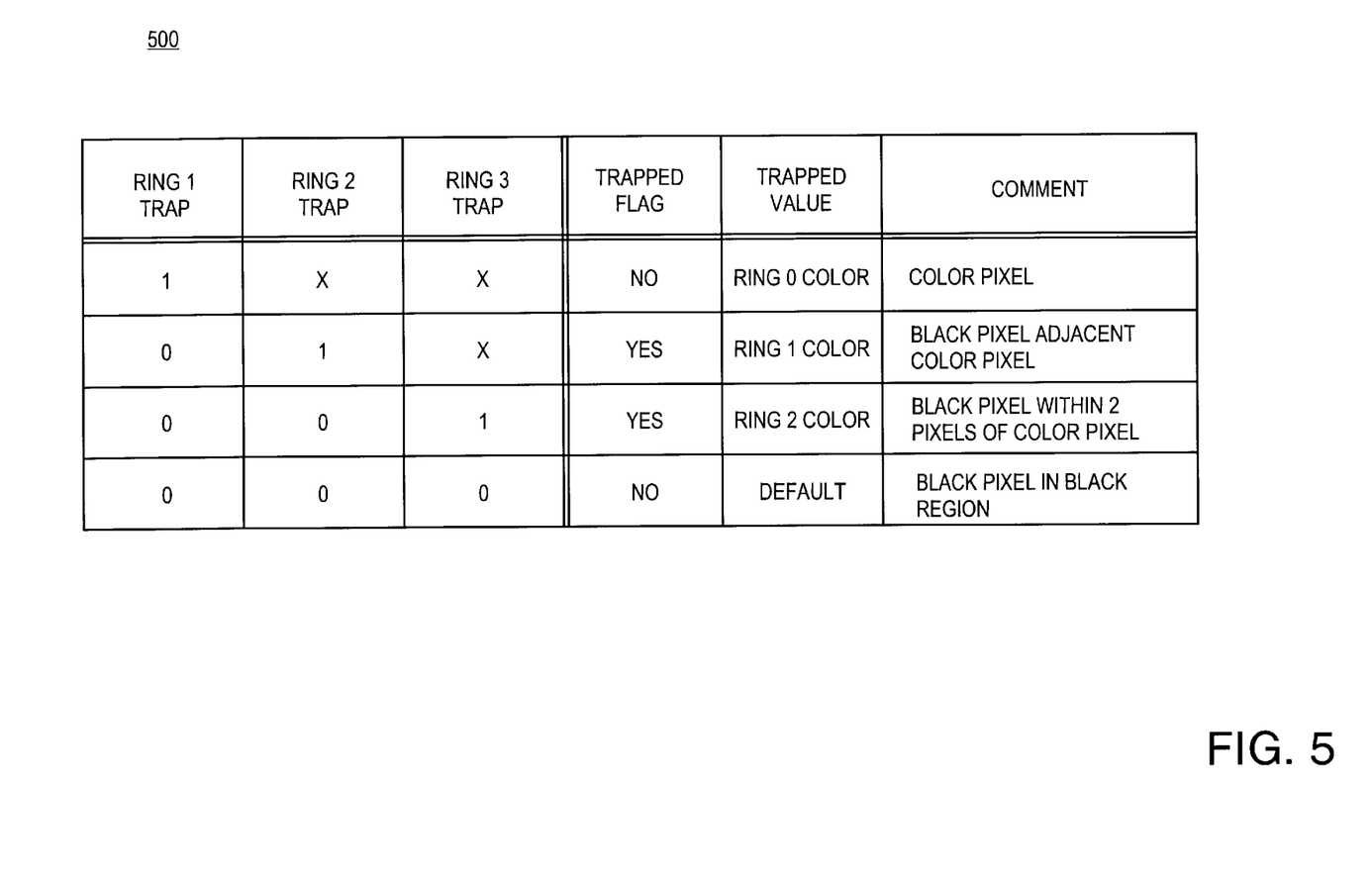
FIG. 5 illustrates a state table for the trapped flag and the trapped value.

In accordance with the truth table of FIG. 5, priority assignment unit 490 sets its trapped flag 492 to "1" if ring 0's trap is not set (i.e., selected pixel is black) and the trap of a ring other than ring 0 is set, otherwise the trapped flag 492 is set to "0." Priority assignment unit 490 selects the trapped value as the ring toner value for the smallest ring having a nonzero (i.e., set) ring trap. This approach prioritizes suggested toner values based on the proximity to the selected pixel.

Once the trapped flags and trapped values have been identified for each color plane, trapped values are substituted for the corresponding toner values of the selected pixel whenever the corresponding trapped flag is enabled. Table I illustrates an example in CMYK color space:

TABLE I

| Color Plane | Trapped Flag | Trapped Value | Selected Pixel | Resulting Pixel |
|---|---|---|---|---|
| C | 1 | v(C) | p(C) | v(C) |
| Y | 0 | v(Y) | p(Y) | p(Y) |
| M | 1 | v(M) | p(M) | v(M) | where v(C), v(Y), and v(M) indicate the trapped values for the cyan, yellow, and magenta color planes and p(C), p(Y), and p(M) indicate the pre-existing cyan, yellow, and magenta toner values for the selected pixel. Assuming trapping is enabled, the pre-existing value for a given color plane of the selected pixel is replaced by the trapped value for that same color plane if the associated trapped flag is set.

With respect to pixel classifier 450, the complexity of determining whether a pixel is black or not black may depend on the color space used. For example, a pixel may be deemed to be black if the K-plane value for the pixel exceeds a pre-determined threshold in a CMYK color space. In alternative color spaces (e.g., RGB), the color black may be generated by combining other colors. As a result, computations may need to be performed to determine whether the various color plane values associated with a pixel lie within a pre-determined "black" subset of the chosen color space.

Figure 6:
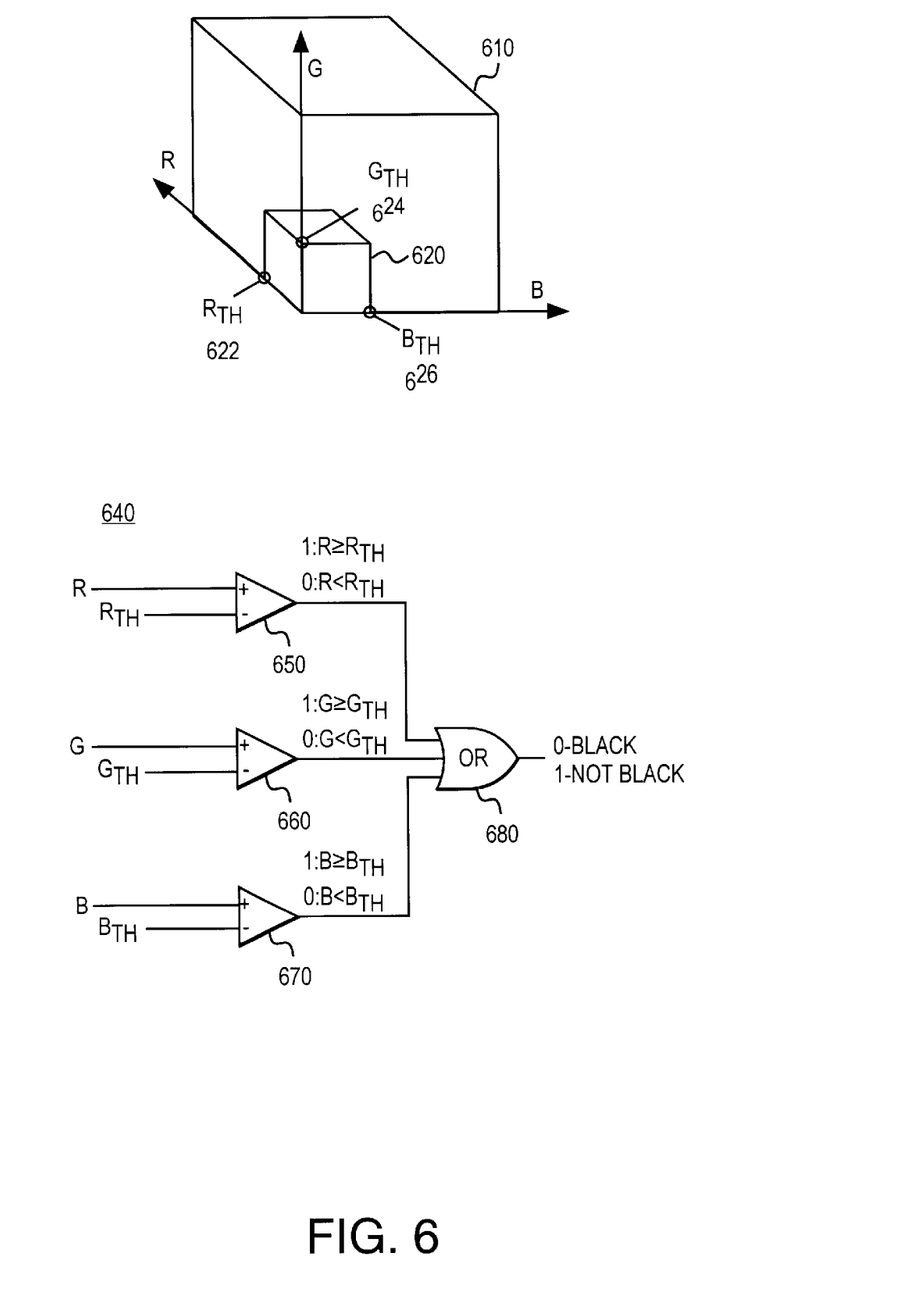
FIG. 6 illustrates circuitry for identifying the subset of an RGB color space corresponding to black when the subset is of the form of a cube.

FIG. 6, for example, illustrates a red-green-blue (RGB) color space 610. A pre-determined subset of the color space is associated with the color black. In the illustrated embodiment, cube 620 indicates the region within RGB color space that may be classified as "black." Pixels having a color value within cube 610 will be classified as black. The size of the cube may be set by varying the $R_{TH}$ (622), $G_{TH}$ (624), and $B_{TH}$ (626) parameters such that the black area is a nonsingular region (i.e., not limited to a single value) of the color space.

Circuitry 640 illustrates logic circuitry capable of determining whether the color associated with a given pixel is black. Comparators 650, 660, and 670 indicate whether one input (+) exceeds the other input (−) for their associated axis of the color space. Thus, for example, comparator 650 provides a "1" if $R > R_{th}$, otherwise comparator provides a 0. The outputs of the comparators are provided to OR gate 680. OR gate 680 indicates a "0" (i.e., "black") only if the red, green, and blue values for a given color reside within cube 620. Otherwise, if any individual value places the color value outside of the cube, OR gate 680 indicates a "1" corresponding to a color other than black.

Figure 7:
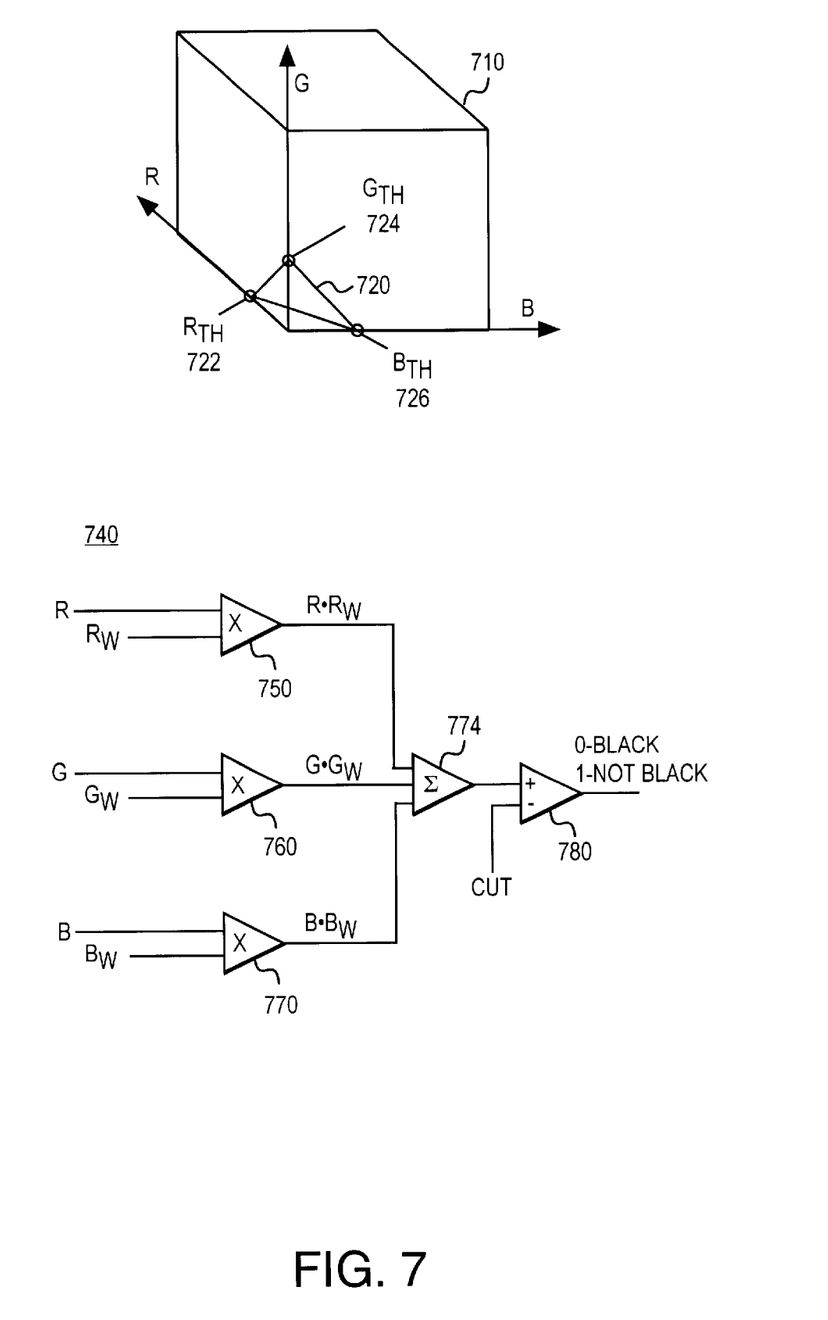
FIG. 7 illustrates circuitry for identifying the subset of an RGB color space corresponding to black when the subset includes all values bound between the RGB axes and a plane intersecting those axes.

Other subsets of the color space may be used to define black. FIG. 7 illustrates an RGB color space 710 with black defined as the subset of the color space bound by plane 720 and the planes defined by each pair (R-G, R-B, and G-B) of axes. Circuitry 740 identifies whether a particular color value lies within this subset.

The individual components of an RGB color space pixel are provided to multipliers 750, 760 and 770 along with associated weighting factors $R_w$, $G_w$, $B_w$. The output of each multiplier is provided to adder 774. The resulting sum is provided to comparator 780 which compares the sum with a threshold value referred to as CUT. As long as the sum exceeds CUT, the comparator provides a "1" indicating that the value is not black. If, however, the sum is less than or equal to the cut value, then the comparator 680 provides a "0" which is indicative of the color black. The relationship between the weighting factors and the R, G, and B axis intersection points is as follows:

$$R_{TH} = \frac{CUT}{R_W}; \quad G_{TH} = \frac{CUT}{G_W}; \quad \text{and } B_{TH} = \frac{CUT}{B_W}.$$

The pixel classifier can be extended to categorize with more than two classifications such that the trapping analysis process can be applied to handle misregistration between any two distinct colors. Thus, for example, the pixel classifier may be extended to identify green vs. non-green, etc.

Figure 8:
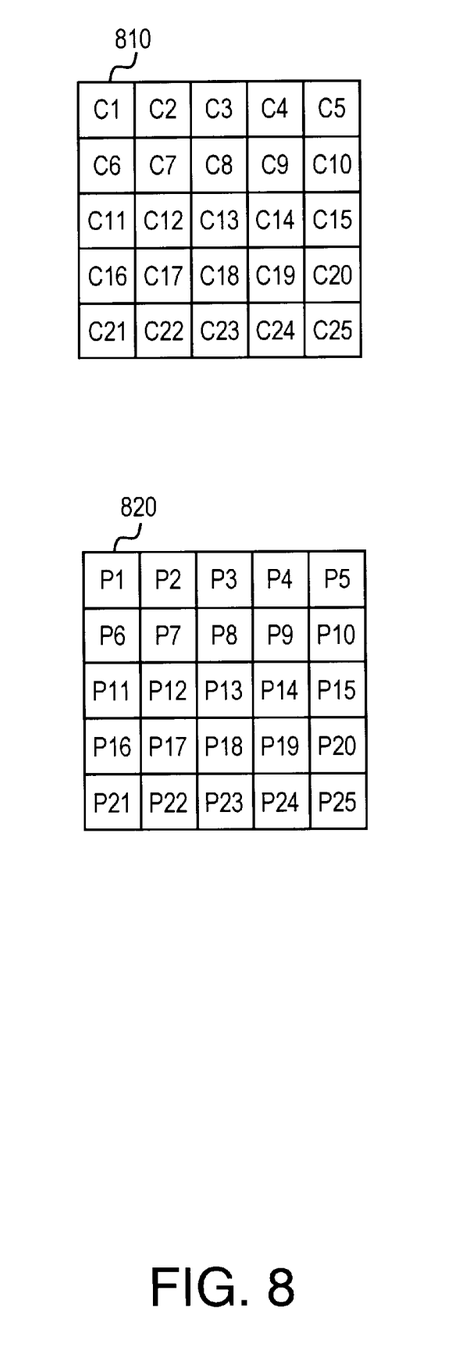
FIG. 8 illustrates nomenclature and pixel locations used to define the ring trap and ring color equations for each ring.

FIG. 8 illustrates the assignment of the variables for the purpose of deriving formulaic expressions for the ring flag and ring value variables. The location of the individual pixels p1 ... p25 and associated classification values c1 ... c25 are indicated by grids 810 and 820.

For ring 0, the value and flag variables are determined as follows:

ring 0 flag=c13 ring 0 value p13

For ring 1, the value and flag variables are determined as follows:

$$\text{ring 1 flag} = (c7 + c8 + c9 + c12 + c14 + c17 + c18 + c19)$$
$$\text{ring 1 value} = \max(p7, p8, p9, p12, p14, p17, p18, p19)$$

For ring 2, the value and flag variables are determined as follows:

$$\text{ring 2 flag} = (c1 + c2 + c3 + c4 + c5 + c6 +$$
$$c10 + c11 + c15 + c16 + c20 +$$
$$c21 + c22 + c23 + c24 + c25)$$
$$\text{ring 2 value} = \max(p1, p2, p3, p4, p5, p6, p10,$$
$$p11, p15, p16, p20, p21, p22,$$
$$p23, p24, p25)$$

The term "max" indicates the maximum toner value (i.e., furthest away from no toner for the selected color plane). The term "+" in this context refers to the boolean OR function.

The ring trap logic and priority assignment unit are replicated for each color plane under analysis. The analysis for each ring of each color plane can be conducted substantially simultaneously (i.e., in parallel). Thus the trap logic of FIG. 4 is replicated for each color plane that must be analyzed. For handling misregistration due to black, there would be three sets of the plurality of ring trap logic circuits for either RGB (i.e. R, G, B) or CMYK (i.e., C, M, Y) color space.

The trapping process may be extended to handle horizontal and vertical registration errors of greater dimensions (e.g., rings more than two pixels from the selected pixel). In addition, the rings may be selected to combat mismatched horizontal and vertical misregistration errors by selecting m other than 0. In such a case the rings become oval or rectangular rather than circular or square as is the case with m=0.

The trapping process described above may also be used to ameliorate the receding edge problem found in EP printing processes. The receding edge problem results from a weak charge buildup on the EP photoconductor near the end of the line screen halftoning structure. Less toner is deposited at line endpoints as a result. The approach presented above effectively extends the line endpoints into the black regions. After halftoning, non-black line screen endpoints are extended into the black color such that the receding edge artifact is less visible.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising the steps of:
   a) selecting a region of a source image comprising a plurality of concentric rings of pixels centered about a selected pixel wherein each pixel has a plurality of toner values each associated with a non-black color plane; and
   b) generating a trapped value for each color plane of the selected pixel, wherein the trapped value for a selected color plane corresponds to the maximum toner value for that color plane within the smallest ring having at least one non-black pixel.

2. The method of claim 1 further comprising the step of:
   c) generating a trapped flag for each color plane of the selected pixel, wherein the trapped flag for a selected color plane is enabled only if the selected pixel is black and at least one ring not comprising the selected pixel includes a pixel having a nonzero toner value for the selected color plane.

3. The method of claim 2 further comprising the step of:
   d) substituting the trapped value for the corresponding toner value of a given color plane of the selected pixel if the trapped flag for the given color plane is enabled and trapping is enabled.

4. The method of claim 2 further comprising the step of:
   d) substituting the trapped value for the corresponding toner value of a given color plane of the selected pixel if the trapped flag for the given color plane is enabled.

5. The method of claim 1 wherein the toner values are associated with one of a red-green-black (RGB) and a cyan-magenta-yellow-black (CMYK) color space.

6. The method of claim 5 wherein a nonsingular subset of the color space defines what is black.

7. The method of claim 6 wherein the subset forms a cube.

8. The method of claim 6 wherein the subset is bounded by planes formed by each pair of axes of the color space and a plane intersecting the axes of the color space.

9. The method of claim 1 further comprising the step of classifying each pixel within the selected region as black or not black.

10. An apparatus comprising:
    a pixel classifier classifying each pixel within a selected region of a source image as black or not black, the selected region comprising a plurality of rings of pixels centered about a selected pixel; and
    a plurality of ring trap logic circuits associated with a selected color plane, wherein each trap logic circuit generates a trap flag and a toner value for an associated selected ring of pixels, wherein the ring toner value is the maximum toner value for the selected color plane within the selected ring, wherein the trap flag indicates whether at least one pixel within the selected ring is not black.

11. The apparatus of claim 10 further comprising:
    a priority assignment unit coupled to the ring trap logic circuits providing a trapped flag if the trap flag for any ring trap logic other than that associated with the ring comprising the selected pixel is set, wherein the priority assignment unit provides a trapped value corresponding to the toner value of the smallest ring having its trap flag set.

12. The apparatus of claim 11 further comprising:
    a plurality of multiplexers each coupled to select one of the trapped value and the selected pixel's original toner value for the corresponding color plane in accordance with a control signal; and
    logic circuitry generating the control signals in response to the trapped flag for each color plane and a trap enable signal, wherein the multiplexer associated with a given color plane selects the corresponding trapped value only if the trapped flag for that color plane is set and the trap enable signal is enabled.

13. The apparatus of claim 10 wherein toner values of the pixels are associated with one of a red-green-black (RGB) and a cyan-magenta-yellow-black (CMYK) color space.

14. The apparatus of claim 13 wherein a nonsingular subset of the color space defines what is black.

15. The apparatus of claim 14 wherein the subset forms a cube.

16. The apparatus of claim 14 wherein the subset is bounded by planes formed by each pair of axes of the color space and a plane intersecting the axes of the color space.

17. The apparatus of claim 10 wherein the selected region is M by N pixels in size, wherein M and N are integer values.

18. The apparatus of claim 17 wherein M=N.

19. The apparatus of claim 17 wherein M≠N.

* * * * *